(12) United States Patent
Bright et al.

(10) Patent No.: US 10,934,083 B2
(45) Date of Patent: Mar. 2, 2021

(54) EFFICIENT PACKAGING OF PIPE INSULATION OR OTHER MATERIALS

(71) Applicant: JOHNS MANVILLE, Denver, CO (US)

(72) Inventors: Edward Albert Bright, Littleton, CO (US); Jayamalar Dorsey, Broomfield, CO (US); Michael Feagans, Lakewood, CO (US)

(73) Assignee: Johns Manville, Denver, CO (US)

( * ) Notice: Subject to any disclaimer, the term of this patent is extended or adjusted under 35 U.S.C. 154(b) by 303 days.

(21) Appl. No.: 15/980,931

(22) Filed: May 16, 2018

(65) Prior Publication Data

US 2019/0352085 A1    Nov. 21, 2019

(51) Int. Cl.
| | | |
|---|---|---|
| B65D 85/14 | (2006.01) | |
| F16L 59/14 | (2006.01) | |
| B65B 13/20 | (2006.01) | |

(52) U.S. Cl.
CPC .............. B65D 85/14 (2013.01); B65B 13/20 (2013.01); F16L 59/14 (2013.01)

(58) Field of Classification Search
CPC .......... B65D 85/14; B65B 13/20; F16L 59/14
USPC ................................................. 138/156, 149
See application file for complete search history.

(56) References Cited

U.S. PATENT DOCUMENTS

| | | | | | |
|---|---|---|---|---|---|
| 446,663 | A | * | 2/1891 | Denney | B31C 1/00 493/276 |
| 4,192,352 | A | * | 3/1980 | Hakamada | H01B 7/24 138/149 |
| 4,576,206 | A | * | 3/1986 | Lauren | B32B 1/08 138/149 |
| 4,699,243 | A | * | 10/1987 | Enoki | F01N 13/14 181/207 |
| 5,690,147 | A | * | 11/1997 | Cridland | F16L 59/10 138/149 |
| 6,460,576 | B2 | * | 10/2002 | Vitoorapakorn | F16L 3/1233 138/149 |
| 6,782,922 | B1 | * | 8/2004 | Migliorini | F16L 59/023 138/149 |
| 7,749,923 | B2 | * | 7/2010 | Moore | B32B 15/04 442/23 |
| 10,612,717 | B2 | * | 4/2020 | Fay | F16L 59/14 |
| 2008/0006362 | A1 | * | 1/2008 | Bright | B29C 63/06 156/64 |

(Continued)

*Primary Examiner* — Craig M Schneider
*Assistant Examiner* — David R Deal
(74) *Attorney, Agent, or Firm* — Robert D. Touslee

(57) ABSTRACT

A collapsible product has a tubular body of resilient material, the tubular body having an outer surface and an inner surface, a length, a wall between the outer surface and the inner surface, and a longitudinal axis. The tubular body wall is split longitudinally along its length, at a first perimeter location on the tube. The tubular body wall is also cut longitudinally along its length, partially through its wall thickness from the inner surface, at one or more inner perimeter locations. The tubular body wall is further cut longitudinally along its length, partially through its wall thickness from the outer surface, at two or more outer perimeter locations. The longitudinal cuts enable a controlled collapse of the tubular body, which can be efficiently packaged for shipping. The collapsible product may be tubular fiberglass pipe insulation, or another kind of product.

22 Claims, 8 Drawing Sheets

(56) References Cited

U.S. PATENT DOCUMENTS

2013/0291984 A1\* 11/2013 Himmel ................. E04C 2/328
　　　　　　　　　　　　　　　　　　　138/32

\* cited by examiner

EFFICIENT PACKAGING OF PIPE INSULATION OR OTHER MATERIALS

BACKGROUND OF THE INVENTION

Insulation has long been applied to pipes to help maintain the temperature of fluids flowing in the pipes. For example, a circulating hot water system in a commercial building typically requires hot water to be carried inside of metal pipes for relatively long distances from a central boiler to points of use distributed throughout the building. It is desirable that the water maintain its temperature to the extent possible during circulation so that it is sufficiently hot at all points of use, and so that variations in temperature between points of use are largely avoided.

BRIEF SUMMARY OF THE INVENTION

According to one aspect, a collapsible product comprises a tubular body of a resilient material. The tubular body has an outer surface and an inner surface, a length, a wall between the outer surface and the inner surface, and a longitudinal axis. The tubular body wall is split longitudinally along the length of the tubular body, at a first perimeter location on the tube. The tubular body wall is also cut longitudinally along the length of the tubular body, partially through its wall thickness from the inner surface, at one or more inner perimeter locations. The tubular body wall is further cut longitudinally along the length of the tubular body, partially through its wall thickness from the outer surface, at two or more outer perimeter locations. In some embodiments, the resilient material comprises fiberglass insulating material. In some embodiments, the insulating material has a bulk density of 1 to 20 lb/ft$^3$. In some embodiments, the collapsible product further comprises a facer adhered to the outer surface of the tubular body. The resilient material may comprise a polymer foam. In some embodiments, the tubular body wall is cut longitudinally along the length of the tubular body, partially through its wall thickness from the inner surface, at a single inner perimeter location opposite the first perimeter location. In some embodiments, the tubular body wall is cut longitudinally along the length of the tubular body, partially through its wall thickness from the inner surface, at multiple inner perimeter locations. In some embodiments, the longitudinal cuts at the outer perimeter locations extend at between 10% and 90% of the way through the wall. In some embodiments, the longitudinal cuts at the outer perimeter locations extend at between 30% and 70% of the way through the wall. In some embodiments, the longitudinal cuts at the outer perimeter locations leave bridges of uncut material at the bottoms of the cuts, the bridges having a thickness of between 0.5 and 3.0 inches. In some embodiments, the longitudinal cuts at the outer perimeter locations leave bridges of uncut material at the bottoms of the cuts, the bridges having a thickness of between 0.75 and 2.0 inches. In some embodiments, the longitudinal cuts at the outer perimeter locations leave bridges of uncut material at the bottoms of the cuts, the bridges having a thickness of between 1.0 and 1.5 inches. The tubular body may be circularly cylindrical. The tubular body may have an inner diameter of between 0.5 and 24 inches. In some embodiments, the wall has a thickness of between 0.5 and 6 inches.

According to another aspect, a method of packaging a collapsible product comprises providing a number of the collapsible products as described above, and flattening the collapsible products into a generally rectangular stack. In some embodiments, the method further comprises inserting corner supports at corners of the generally rectangular stack, and binding the stack with the corner supports in place. In some embodiments, the method further comprises unbinding the stack, such that the collapsible products recover substantially to their original shape. In some embodiments, the method further comprises constraining the stack in a container.

According to another aspect, a package of compressible products comprises a shipping container and a plurality of compressible products within the shipping container. Each of the compressible products further comprises a tubular body of a resilient material, the tubular body having an outer surface and an inner surface, a length, a wall between the outer surface and the inner surface, and a longitudinal axis. The tubular body wall is split longitudinally along the length of the tubular body, at a first perimeter location on the tube. The tubular body wall is cut longitudinally along the length of the tubular body, partially through its wall thickness from the inner surface, at one or more inner perimeter locations, and the tubular body wall is cut longitudinally along the length of the tubular body, partially through its wall thickness from the outer surface, at two or more outer perimeter locations. The compressible products within the shipping container are in a compressed state in which each tubular body is collapsed and the longitudinal cuts are opened. In some embodiments, the resilient material comprises fiberglass insulating material. In some embodiments, the tubular body wall of at least one of the compressible products is cut longitudinally along the length of the tubular body, partially through its wall thickness from the inner surface, at a multiple inner perimeter locations.

DETAILED DESCRIPTION OF THE INVENTION

Figure 1:
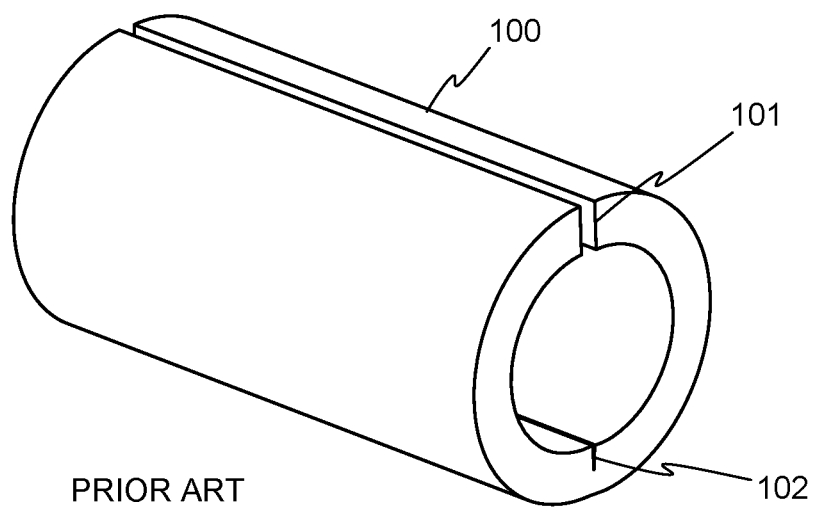
FIG. 1 illustrates a prior art insulation product.
Figure 2:
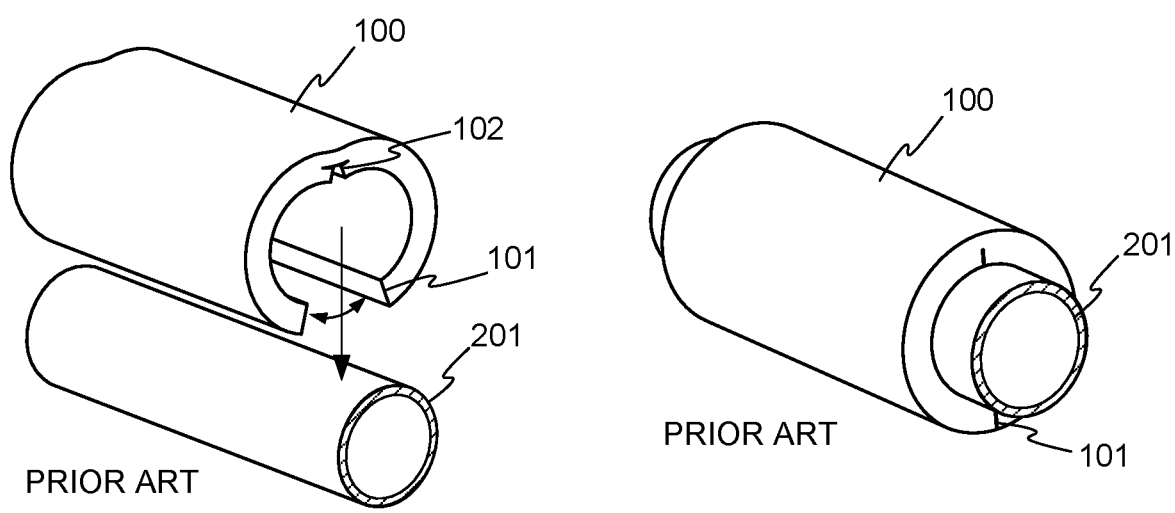
FIG. 2 illustrates the application of the insulation product of FIG. 1 to a pipe.
Figure 3:
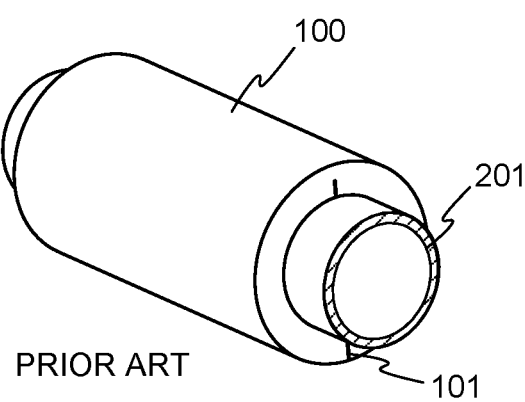
FIG. 3 shows the insulation product of FIG. 1 after installation.

FIGS. 1-3 illustrate a typical insulation product 100 and its use. As shown in FIG. 1, insulation product 100 may be, for example, fiberglass insulation formed into a tubular shape. The tube wall is cut through along its length at cut 101, and is partially cut through along its length at cut 102.

FIG. 2 shows the process of installing insulation product 100 onto a pipe 201. Cut 101 is opened up so that insulation product 100 can be fitted over pipe 201.

FIG. 3 shows the completed installation, with insulation product 100 closed around pipe 201. Cut 101 may be taped or otherwise sealed.

Figure 4A:
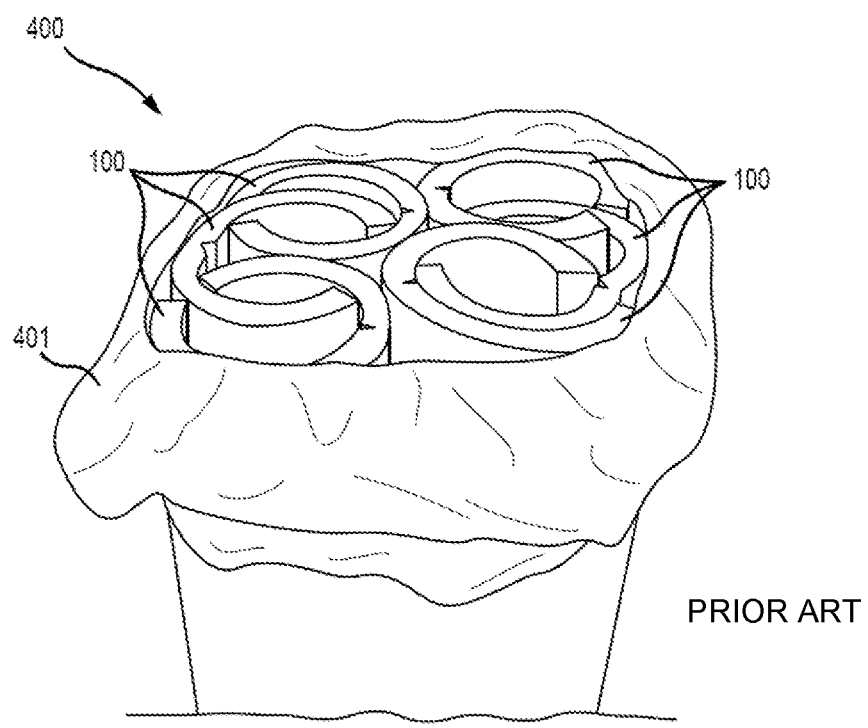
FIG. 4A shows a prior art packaging arrangement.
Figure 4B:
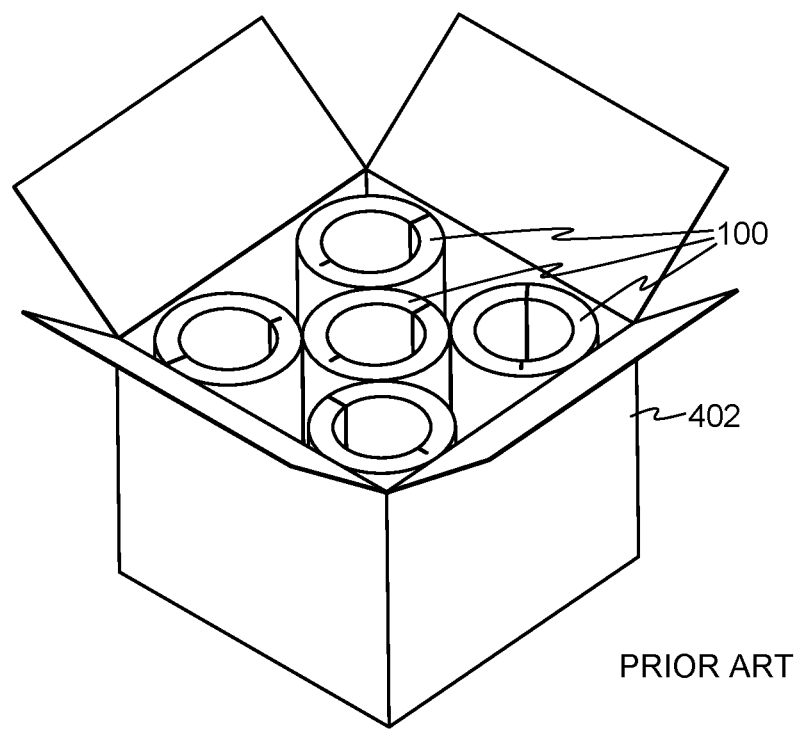
FIG. 4B shows another prior art packaging arrangement.

FIG. 4A shows a prior art packaging arrangement 400, in which six insulation products 100 have been partially opened and nested together, and then wrapped in a bag 401 for shipping. Bag 401 may be, for example, a polyethylene bag or similar. FIG. 4B shows another prior art packaging arrangement in which insulation products 100 have been packed in their cylindrical state in a carton 402.

While the arrangements of FIGS. 4A and 4B have served well, they do sometimes have disadvantages. For example, insulation 100 is semi-rigid, and may be damaged if it is deformed too greatly, especially at locations other than at cut 102. Bag 401 may not provide significant protection to insulation products 100 during shipping and handling, and instances of product damage have been reported, due to tearing or buckling of the material in the relatively thick walls of insulation product 100. In addition, because insulation products 100 as packed in FIGS. 4A and 4B largely maintain their cylindrical shape, they do not pack efficiently, and the overall package dimensions must include significant air spaces in addition to the insulation itself.

Figure 5:
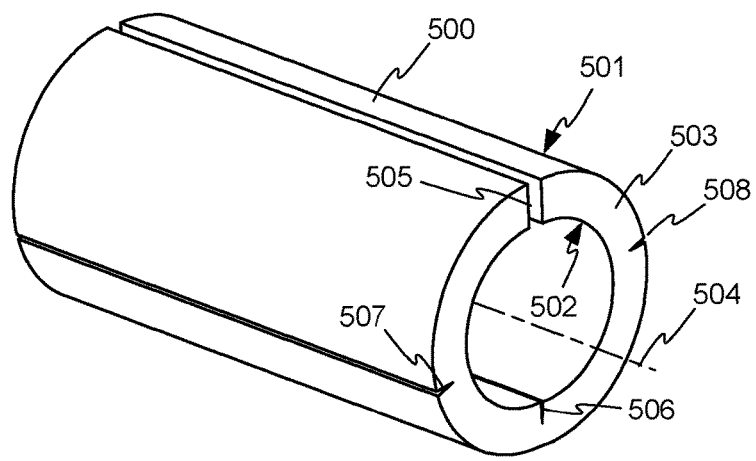
FIG. 5 illustrates an insulation product in accordance with embodiments of the invention.

FIG. 5 illustrates an insulation product 500 in accordance with embodiments of the invention. Insulation product 500 has a tubular body of insulating material. The tubular body has an outer surface 501 and an inner surface 502, wall 503 between the inner and outer surfaces, and a longitudinal axis 504 along which a length of the product 500 is measured. Wall 503 has a thickness, measured radially between outer and inner surfaces 501 and 502. While the tubular body of insulation product 500 is in the shape of a circular cylinder, this is not a requirement. Insulation products embodying the invention may have cross sections other than circular, for example oval, elliptical, rectangular, square, polygonal, or another shape.

The material of insulation product 500 may be fiberglass, a polymer foam such as a urethane foam, or another kind of insulating material.

Insulation product 500 may be provided in any workable size, but is preferably available in sizes whose inner diameters conform to at least some standard iron and copper pipe sizes. Various wall thicknesses may be provided, and a wall thickness may be selected for a particular application based on such variables as the temperature of the fluid in the pipe being insulated, the thermal conductivity of the insulation material, the maximum allowable temperature of the outside surface of the insulation, the diameter of the pipe being insulated, the cost of the insulation and its installation, the cost of heating or cooling the fluid in the pipe being insulated, or other factors. In some embodiments, the insulation product may be circularly cylindrical, with an inner diameter of between 0.5 and 24 inches and a wall thickness between 0.5 and 6 inches, although other sizes are possible.

Other properties of insulation product 500 may be selected as needed. For example, the insulating material in insulation product 500 may have a bulk density of between 1 and 20 lb/ft$^3$, preferably between 2 and 10 lb/ft$^3$, and more preferably between 3 and 7.5 lb/ft$^3$.

Insulation product 500 is split along its length through wall 503 at cut 505. Cut 505 is at a first location on the perimeter of the tubular shape of insulation product 500. Insulation product 500 is also cut longitudinally along the length of the tubular body, partially through wall 503 from inner surface 502 at cut 506. In this example, cut 506 is at a second perimeter location opposite the first perimeter location of cut 505. Because cut 506 is made from inside surface 502 of insulation product 500, its location may be described as an inner perimeter location.

In addition, cuts 507 and 508 are provided, at perimeter locations between cuts 505 and 506. Because cuts 507 and 508 are made from outer surface 501 of insulation product 500, their locations may be described as outer perimeter locations. Cuts 507 and 508 are similar to cut 506 in that they extend only partially through wall 503, but are made from outside surface 501 rather than from inside surface 502. While only two cuts 507 and 508 are shown, any workable number of cuts may be used, and may preferably be distributed around the perimeter of insulation product 500. The cuts may be distributed evenly around the perimeter of insulation product 500, or in another arrangement.

Cuts 505, 506, 507, and 508 are preferably narrow slits that sever the material of insulation product 500 with little or no material removal. For example, the cuts may be made by one or more knives or narrow slitting saws. The widths of the various cuts may be exaggerated in the figures for ease of explanation. In other embodiments, wider cuts may be used.

Figure 6:
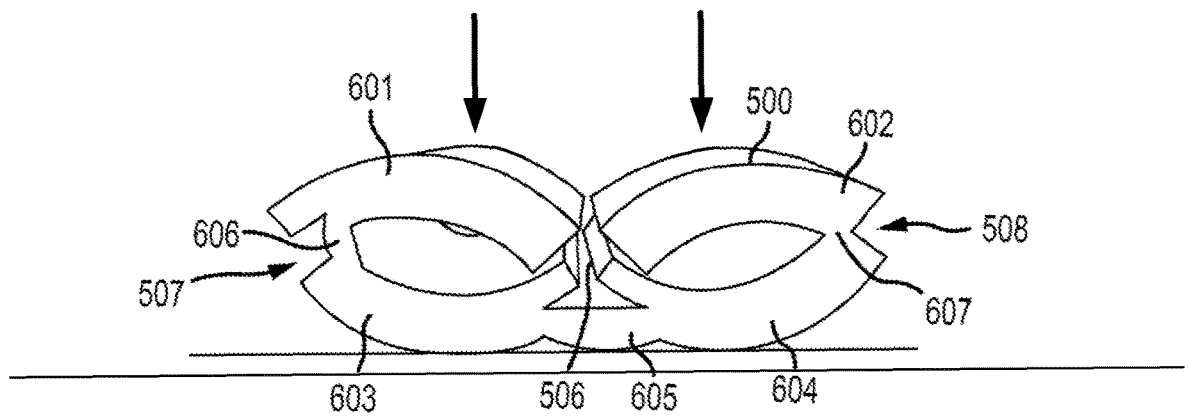
FIG. 6 illustrates a controlled collapse of the insulation product of FIG. 5.

As is shown in FIG. 6, cuts 505, 506, 507, and 508 permit a controlled collapse of insulation product 500. As sections 601 and 602 of insulation product 500 are forcibly moved toward sections 603 and 604, cuts 506, 507, and 508 open, permitting sections 601, 602, 603, and 604 to substantially maintain their partially-cylindrical shapes. Bridges 605, 606, and 607 of material left by the cuts deform, but because they are thinner than the wall thickness of insulation product 500, the deformation does little or no damage to the insulating material.

The depths of cuts 506, 507, and 508 may be selected so that bridges 605, 606, and 607 are thin enough to permit collapse of insulation product 500 without significant damage, but thick enough to maintain stress tending to counteract the deformation. In some embodiments, cuts 506, 507, and 508 may extend between 10 and 90 percent of the way through wall 503. In other embodiments, cuts 506, 507, and 508 may extend between 30 and 70 percent of the way through wall 503. In other embodiments, the depths of the cuts may be selected to leave a predetermined thickness of bridges 605, 606, and 607 at the bottom of the cuts, regardless of the thickness of wall 503. For example, bridges of 0.5, 1.0, 1.5, 2.0, or 3.0 inches in thickness may be provided, or another workable thickness. The thickness may depend on the particular insulating material used. The various partial-thickness cuts need not all be of the same depth, and the various bridges need not all be of the same thickness.

Figure 7:
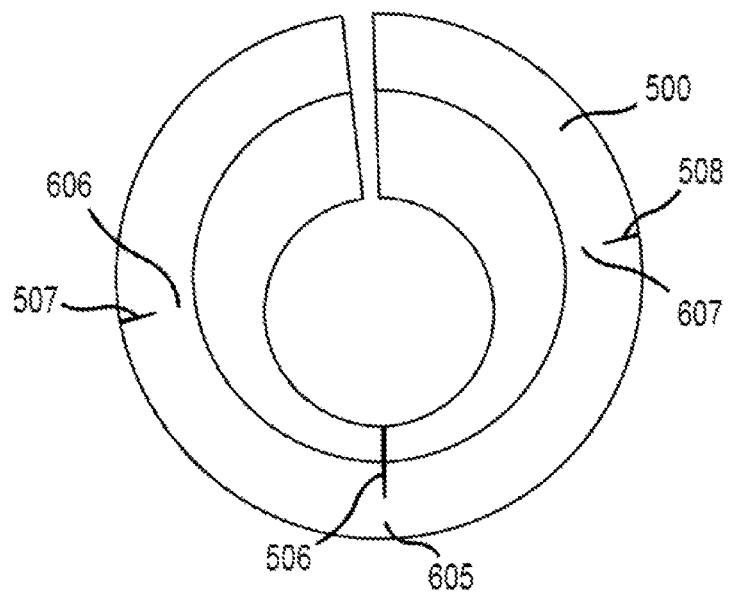
FIG. 7 shows the recovery of the insulation product of FIG. 5 after the controlled crushing of FIG. 6.

Preferably, as shown in FIG. 7 in a longitudinal perspective view, once the compressing force is removed from insulation product 500, the residual stress in bridges 605, 606, and 607 can substantially restore insulation product 500 to its original shape. In FIG. 7, cuts 506, 507, and 508 have substantially closed due solely to the restoring force provided by bridges 605, 606, and 607.

Experiments have shown that for a fiberglass insulation product having an inside diameter of 6 inches, a wall thickness of 1.5 inches, and a density of 3.3 lb/ft$^3$, and bridge thicknesses of about 1.0 inches, the insulation product can recover to its cylindrical shape after being constrained in the collapsed state of FIG. 6 for at least several days.

This capability enables more efficient and robust packaging of insulation products 500. FIGS. 8-11 illustrate the packaging of six insulation products 500, taking advantage of the reversible collapsibility described above.

Figure 8:
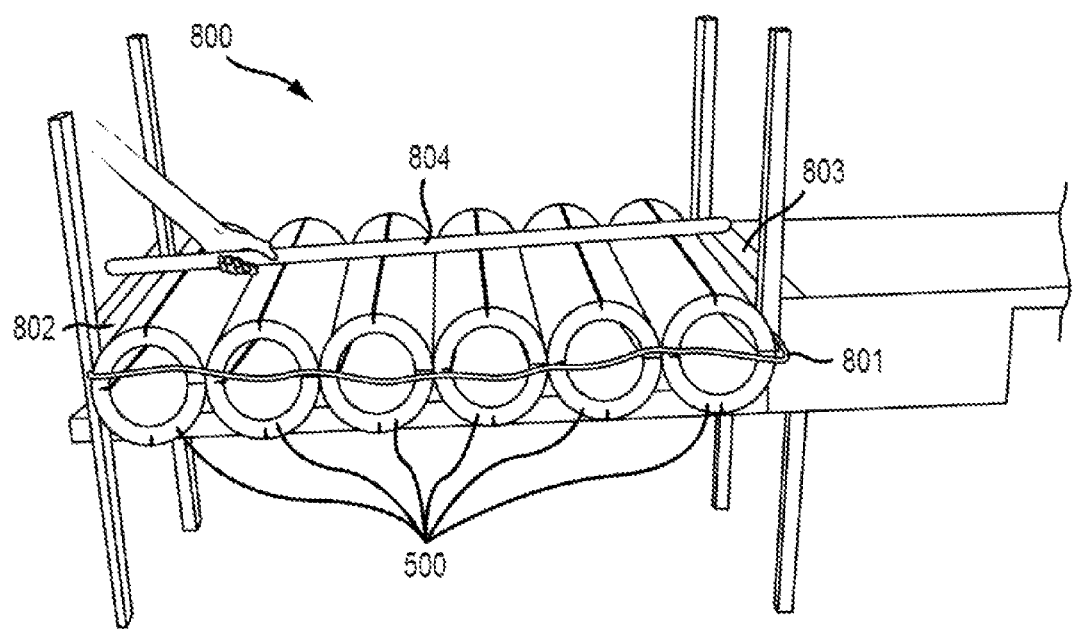
FIG. 8 illustrates a stage in the packaging of a number of insulation products, in accordance with embodiments of the invention.

In FIG. 8, six insulation products 500 are laid side-by-side in a packaging station 800. Insulation products 500 are oriented such that one of the outer longitudinal cuts, for example cut 507 or 508, is upward in each. While six insulation products 500 are used in this example, other numbers may be packaged together if desired. A binding 801 in the form of twine, wire, strapping, or another material may be placed around the insulation products 500. Insulation products 500 are constrained by a fixed end 802 and a movable ram 803 of packaging station 800. An operator may also constrain insulation products 500 vertically using a pole 804 or other device. In other embodiments, packaging station 800 may include a vertical constraint.

Figure 9:
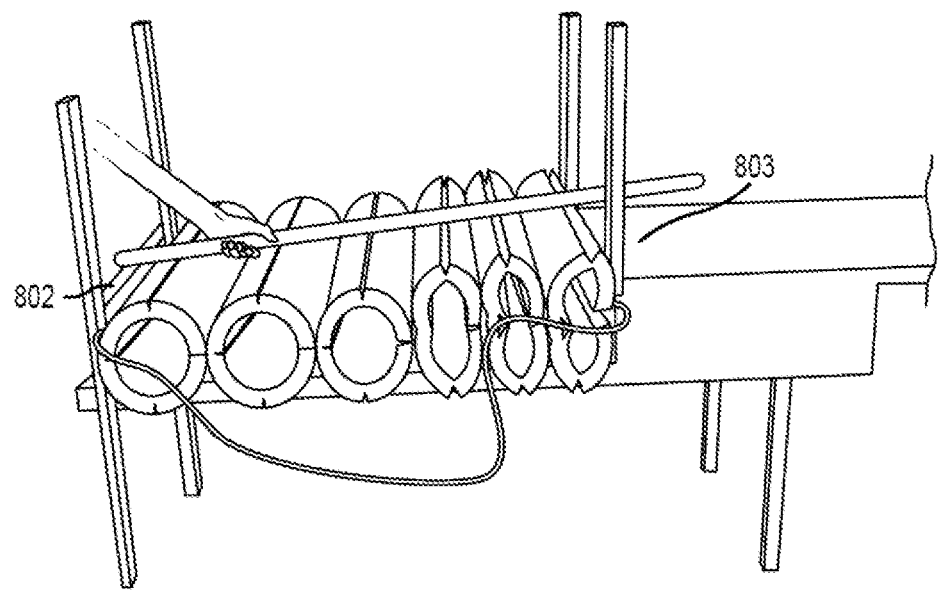
FIG. 9 illustrates another stage in the packaging of a number of insulation products, in accordance with embodiments of the invention.
Figure 10:
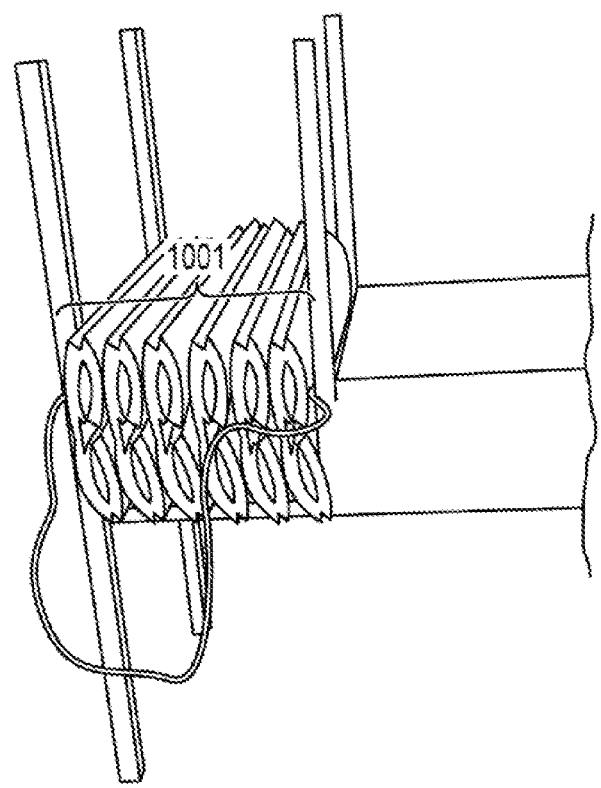
FIG. 10 illustrates another stage in the packaging of a number of insulation products, in accordance with embodiments of the invention.

As shown in FIG. 9, insulation products 500 are compressed by moving movable ram 803 of packaging station 800 toward fixed end 802. FIG. 10 shows the six insulation products 500 after compression to form a stack 1001.

Figure 11:
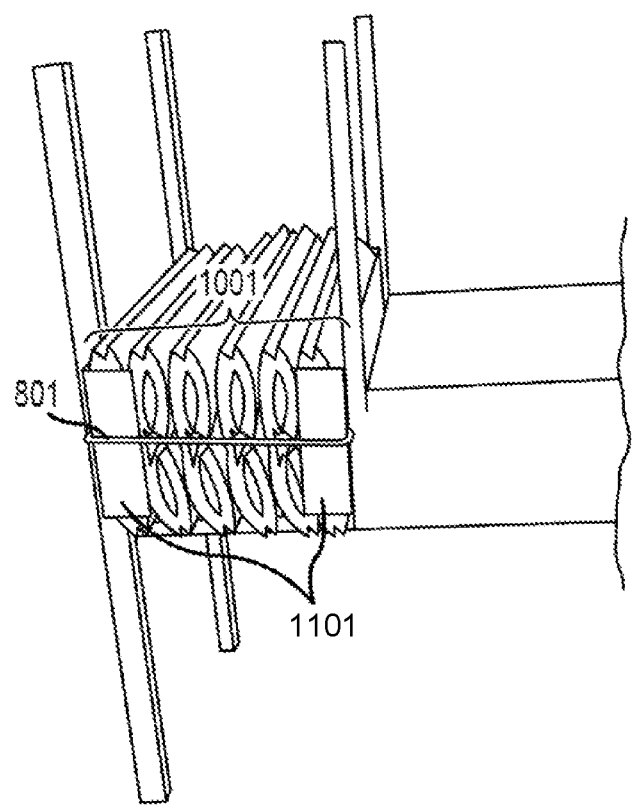
FIG. 11 shows a bound stack of insulation products in accordance with embodiments of the invention, including corner supports.

In FIG. 11, corner supports 1101 have been placed at the corners of stack 1001, and binding 801 has been tightened to bind stack 1001.

Figure 12:
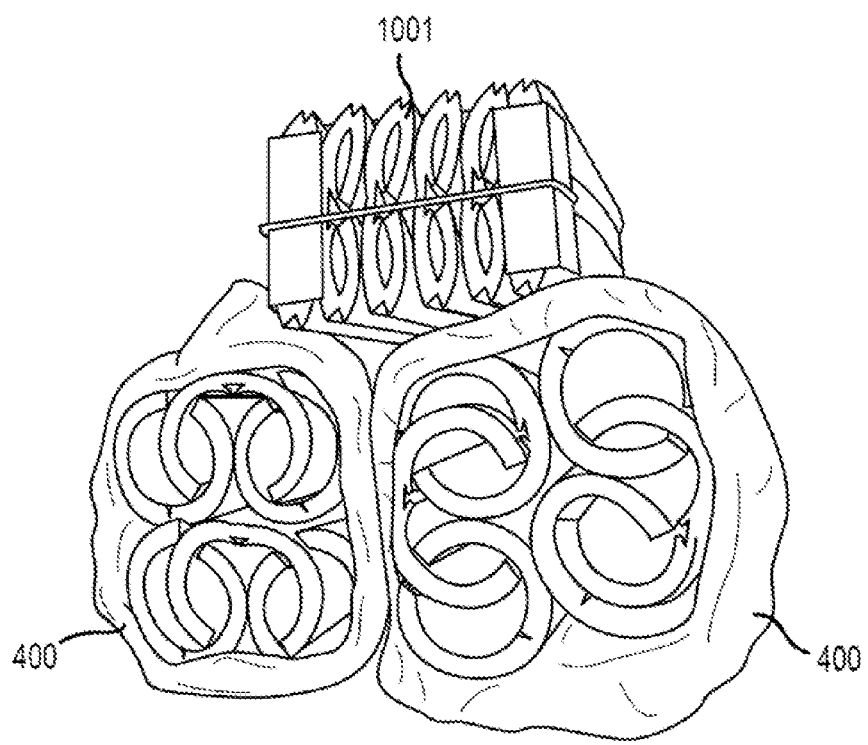
FIG. 12 shows a comparison of the stack of FIG. 11 with a prior packaging arrangement.

FIG. 12 shows completed and bound stack 1001, comprising six insulation products, adjacent to two prior art packages each also comprising six insulation products of the same size. As is apparent, stack 1001 is considerably smaller than either of the prior art packages 400. Thus, stacks 1001 may make more efficient use of space in a truck or shipping container. In addition, the compact and protected nature of stack 1001 makes insulation products 500 in stack 1001 much less prone to shipping damage than insulation in the prior arrangement.

In other embodiments, the stack of insulation products need not be bound, but may be placed in a box, crate, carton, or other container for shipping. The container may constrain the stack in its compressed state. Insulation products may re-expand upon being removed from the container.

Figure 13:
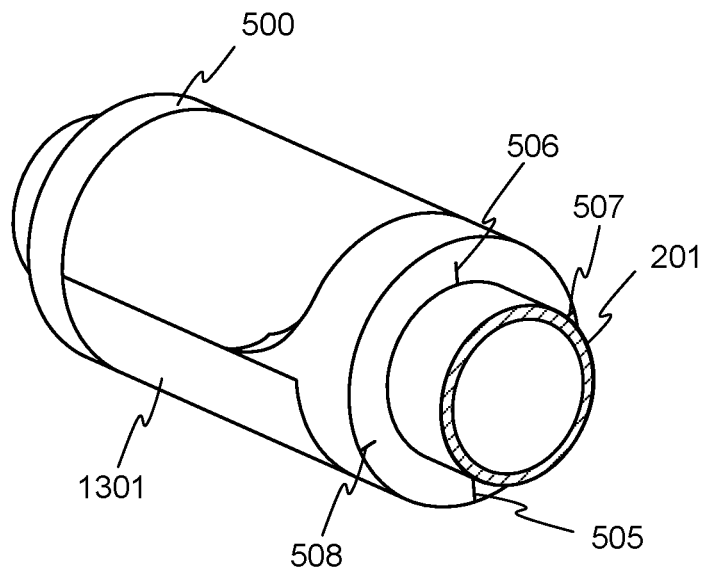
FIG. 13 illustrates an insulation product with a facer, in accordance with embodiments of the invention.

FIG. 13 shows insulation product 500 after installation on a pipe 201. Cuts 505, 506, 507, and 508 have substantially closed as insulation product 500 is closed around pipe 201. An optional facer 1301 has been added, for protection of insulation product 500. Facer 1301 may be, for example, a layer of metal foil, a foil-scrim-kraft (FSK) material, or another kind of facer. In other embodiments, a rigid plastic or metal casing may be applied to insulation product 500, for additional protection. A facer such as facer 1301 may be added to the insulation at the factory (so that it is present during collapse and shipping of the insulation), or upon installation.

Figure 14:
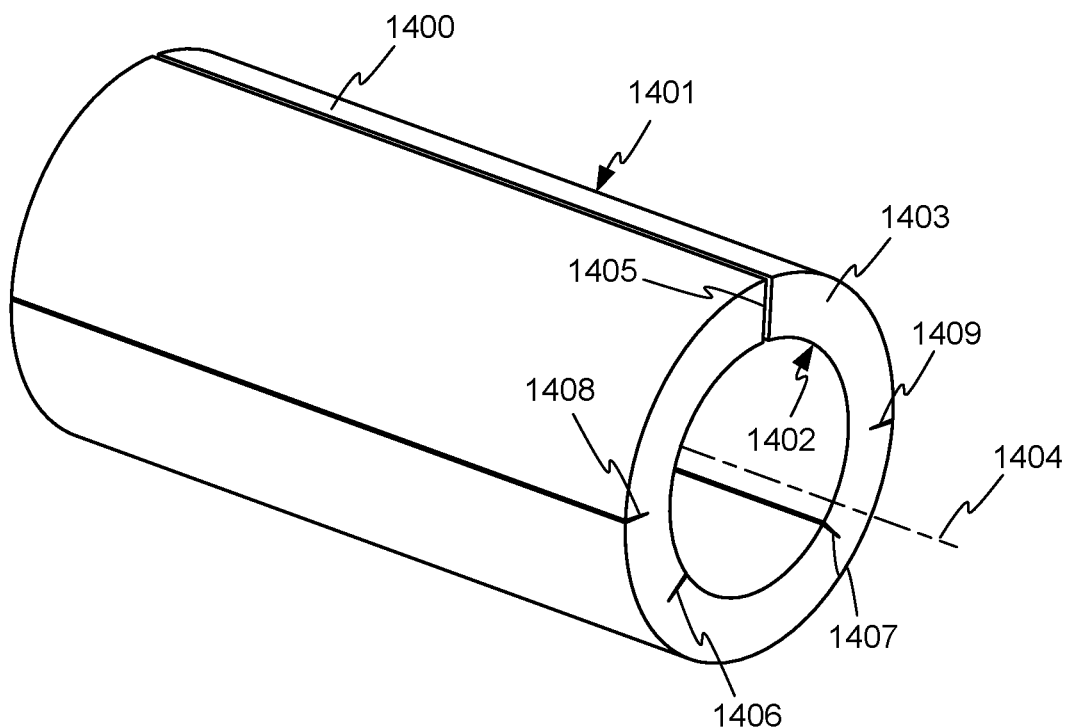
FIG. 14 illustrates an insulation product in accordance with other embodiments.

FIG. 14 illustrates an insulation product 1400 in accordance with other embodiments. Like insulation product 500 described above, insulation product 1400 includes a tubular body of insulating material. The tubular body has an outer surface 1401 and an inner surface 1402, wall 1403 between the inner and outer surfaces, and a longitudinal axis 1404 along which a length of the product 1400 is measured. Wall 1403 has a thickness, measured radially between outer and inner surfaces 1401 and 1402.

Insulation product 1400 may have any of the overall shapes and may be made of any of the materials described above.

Insulation product 1400 is split along its length through wall 1403 at cut 1405. Cut 1405 is at a first location on the perimeter of the tubular shape of insulation product 1400. Insulation product 1400 is also cut longitudinally along the length of the tubular body, partially through wall 1403 from inner surface 1402 at cuts 1406 and 1407. In this example, cuts 1406 and 1407 are positioned at inner perimeter locations that are not opposite cut 1405.

In addition, cuts 1408 and 1409 are provided, at outer perimeter locations between cuts 1405 and 1406, and between cuts 1405 and 1407. Cuts 1408 and 1409 are similar to cuts 1405 and 1406 in that they extend only partially through wall 1403, but are made from outside surface 1401 rather than from inside surface 1402. While only two cuts 1408 and 1409 are shown, any workable number of cuts may be used, and may preferably be distributed around the perimeter of insulation product 1400. The cuts may be distributed evenly around the perimeter of insulation product 1400, or in another arrangement.

Figure 15:
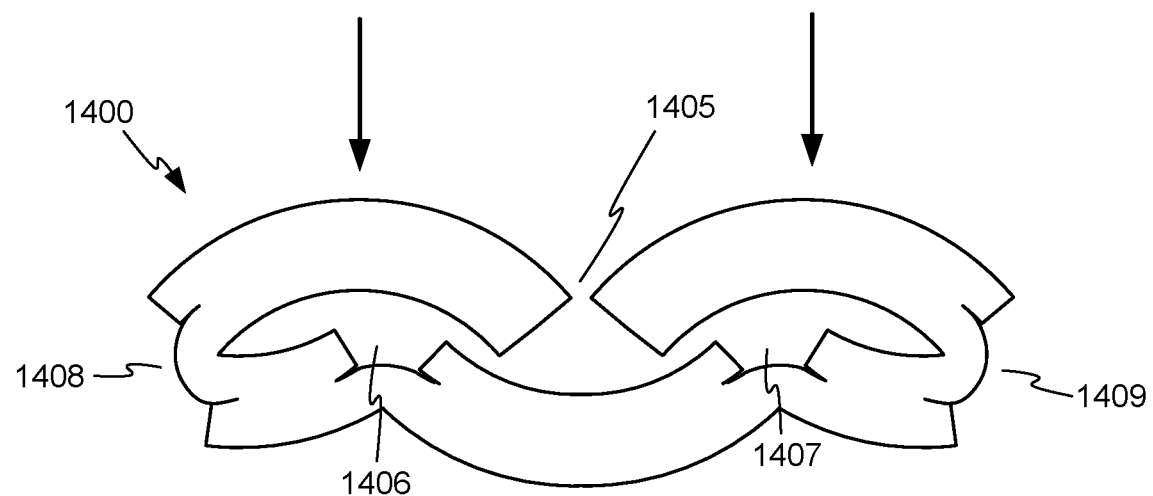
FIG. 15 shows a controlled collapse of the insulation product of FIG. 14.
Figure 16:
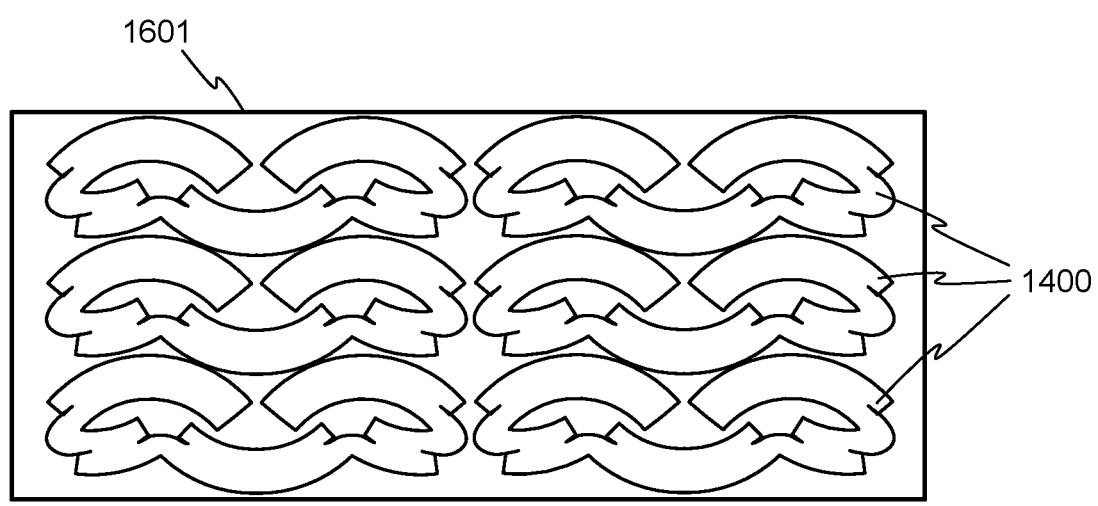
FIG. 16 shows an end view of a stack of insulation products as in FIG. 14, constrained in a shipping carton.

The number and distribution of cuts in insulation product 1400 differs from the number and distribution of cuts in insulation product 500 described above, and insulation product 1400 therefore may collapse somewhat differently than insulation product 500. FIG. 15 shows an end view of insulation product 1400 after collapse. FIG. 16 shows an end view of a stack of insulation products 1400, constrained in a shipping carton 1601. Shipping carton 1601 may be, for example, a cardboard carton of standard or heavy duty wall thickness, or may be another kind of shipping carton.

While embodiments of the invention are described in the context of insulating material, it will be recognized that other products, made of other resilient materials, may be compressed and packaged according to the techniques described above. Examples of other products that may benefit from the invention include padding such as the padding often used on athletic and playground equipment, and packaging material for other tubular items.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

It is to be understood that all workable combinations of the elements and features described herein are considered to be disclosed.

What is claimed is:

1. A collapsible product, comprising:
   a tubular body of a resilient material, the tubular body having an outer surface and an inner surface, a length, a wall between the outer surface and the inner surface, and a longitudinal axis, wherein:
   the tubular body wall is split longitudinally along the length of the tubular body, at a first perimeter location on the tubular body;
   the tubular body wall is cut longitudinally along the length of the tubular body, partially through its wall thickness from the inner surface, at one or more inner perimeter locations; and
   the tubular body wall is cut longitudinally along the length of the tubular body, partially through its wall thickness from the outer surface defining respective longitudinal cuts, at two or more outer perimeter locations.

2. The collapsible product of claim 1, wherein the resilient material comprises fiberglass insulating material.

3. The collapsible product of claim 2, wherein the insulating material has a bulk density of 1 to 20 lb/ft3.

4. The collapsible product of claim 2, further comprising a facer adhered to the outer surface of the tubular body.

5. The collapsible product of claim 1, wherein the resilient material comprises a polymer foam.

6. The collapsible product of claim 1, wherein the tubular body wall is cut longitudinally along the length of the tubular body, partially through its wall thickness from the inner surface, at a single inner perimeter location opposite the first perimeter location.

7. The collapsible product of claim 1, wherein the tubular body wall is cut longitudinally along the length of the tubular body, partially through its wall thickness from the inner surface, at multiple inner perimeter locations.

8. The collapsible product of claim 1, wherein each respective longitudinal cut at the two or more outer perimeter locations extends between 10% and 90% of the way through the wall.

9. The collapsible product of claim 1, wherein each respective longitudinal cut at the two or more outer perimeter locations extends between 30% and 70% through the wall.

10. The collapsible product of claim 1, wherein each respective longitudinal cut at the two or more outer perimeter locations leaves a bridge of uncut material at a bottom of the cut, the bridge having a thickness of between 0.5 and 3.0 inches.

11. The collapsible product of claim 1, wherein each respective longitudinal cut at the two or more outer perimeter locations leaves a bridge of uncut material at a bottom of the cut, the bridge having a thickness of between 0.75 and 2.0 inches.

12. The collapsible product of claim 1, wherein each respective longitudinal cut at the two or more outer perimeter locations leaves a bridge of uncut material at a bottom of the cut, the bridge having a thickness of between 1.0 and 1.5 inches.

13. The collapsible product of claim 1, wherein the tubular body is circularly cylindrical.

14. The collapsible product of claim 1, wherein the tubular body has an inner diameter of between 0.5 and 24 inches.

15. The collapsible product of claim 14, wherein the wall has a thickness of between 0.5 and 6 inches.

16. A method of packaging a collapsible product, the method comprising:
   providing a number of the collapsible products of claim 1; and
   flattening the collapsible products into a generally rectangular stack.

17. The method of claim 16, further comprising:
   inserting corner supports at corners of the generally rectangular stack; and
   binding the stack with the corner supports in place.

18. The method of claim 17, further comprising:
   unbinding the stack, such that the collapsible products recover substantially to their original shape.

19. The method of claim 16, further comprising:
   constraining the stack in a container.

20. A package of compressible products, the package comprising:
   a shipping container; and
   a plurality of compressible products within the shipping container, each of the compressible products further comprising:
   a tubular body of a resilient material, the tubular body having an outer surface and an inner surface, a length, a wall between the outer surface and the inner surface, and a longitudinal axis, wherein:
   the tubular body wall is split longitudinally along the length of the tubular body, at a first perimeter location on the tubular body;
   the tubular body wall is cut longitudinally along the length of the tubular body, partially through its wall thickness from the inner surface, at one or more inner perimeter locations; and
   the tubular body wall is cut longitudinally along the length of the tubular body, partially through its wall thickness from the outer surface defining respective longitudinal cuts, at two or more outer perimeter locations;
   wherein the compressible products within the shipping container are in a compressed state in which each tubular body is collapsed and the longitudinal cuts are opened.

21. The package of claim 20, wherein the resilient material comprises fiberglass insulating material.

22. The package of claim 20, wherein the tubular body wall of at least one of the compressible products is cut longitudinally along the length of the tubular body, partially through its wall thickness from the inner surface, at a multiple inner perimeter locations.

* * * * *